Figure 1:
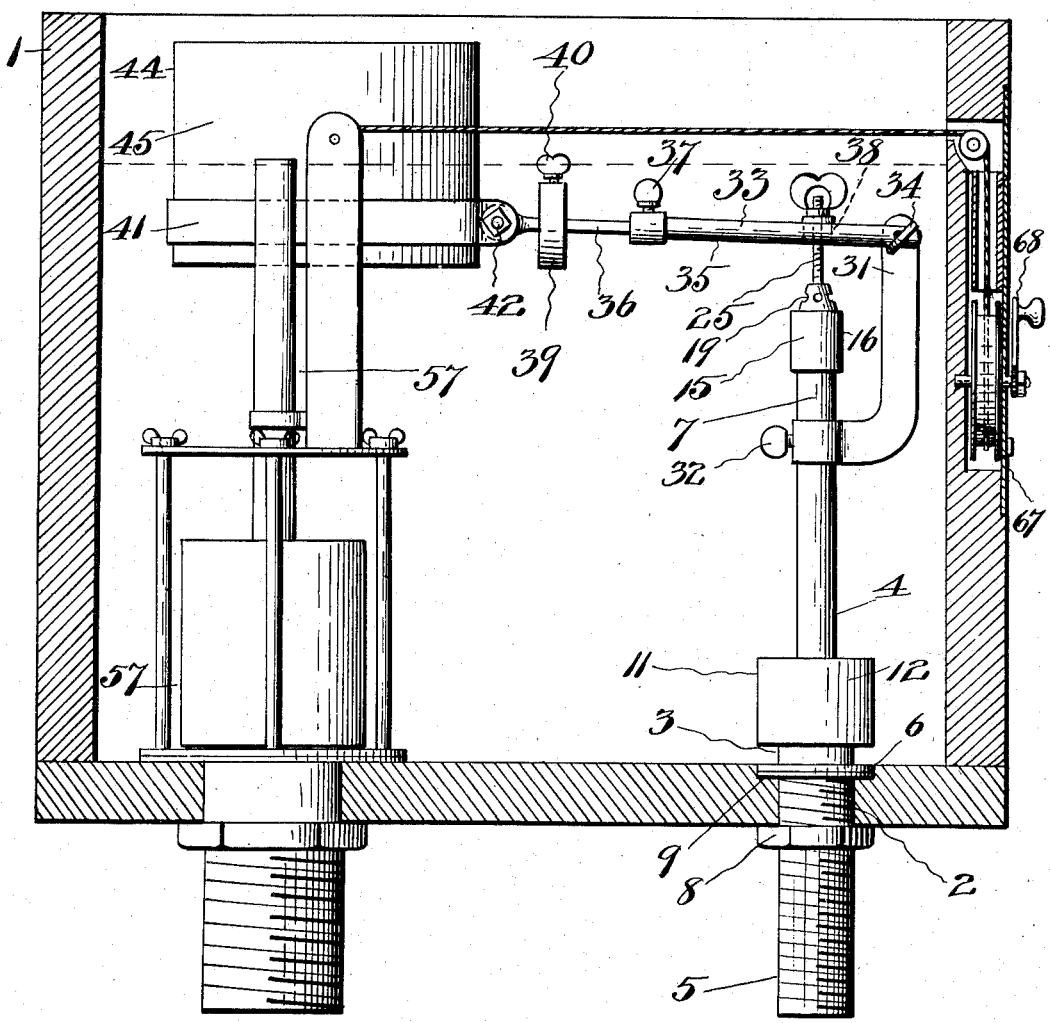

T. P. MOSELEY.
VALVE.
APPLICATION FILED FEB. 24, 1910.

1,015,453.

Patented Jan. 23, 1912.
3 SHEETS—SHEET 1.

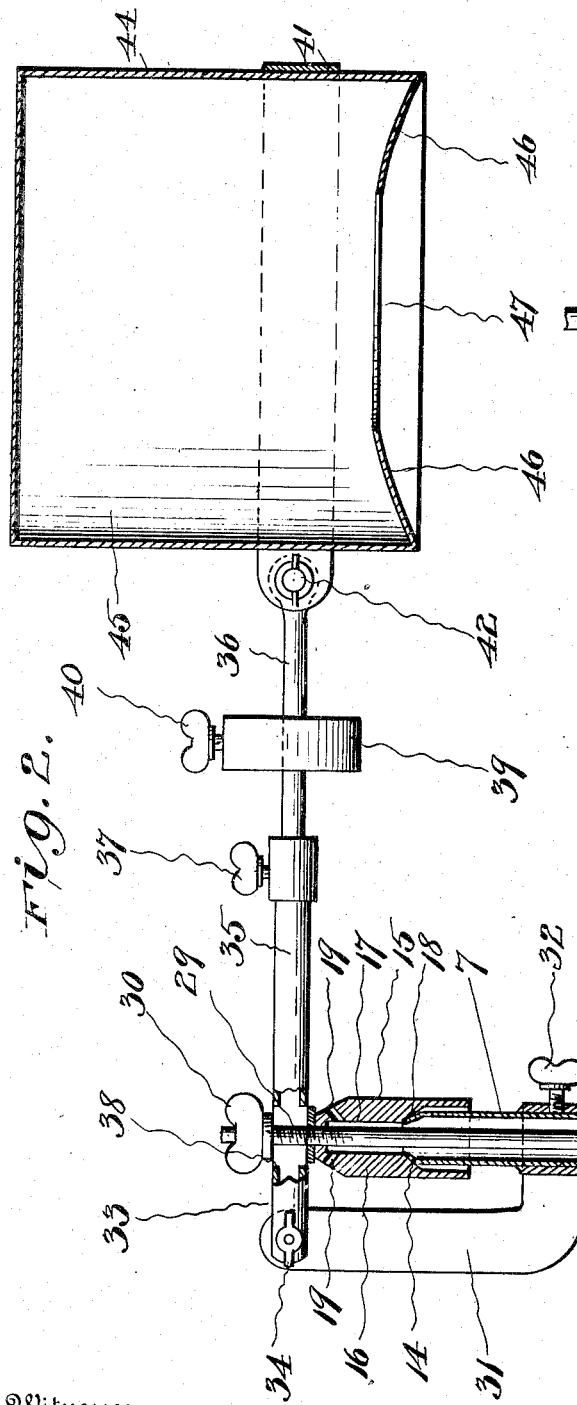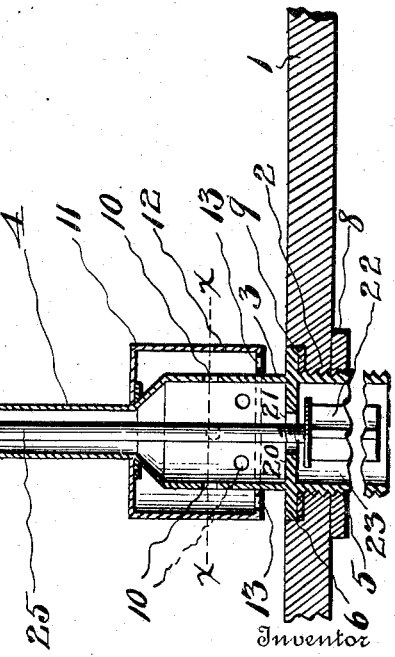

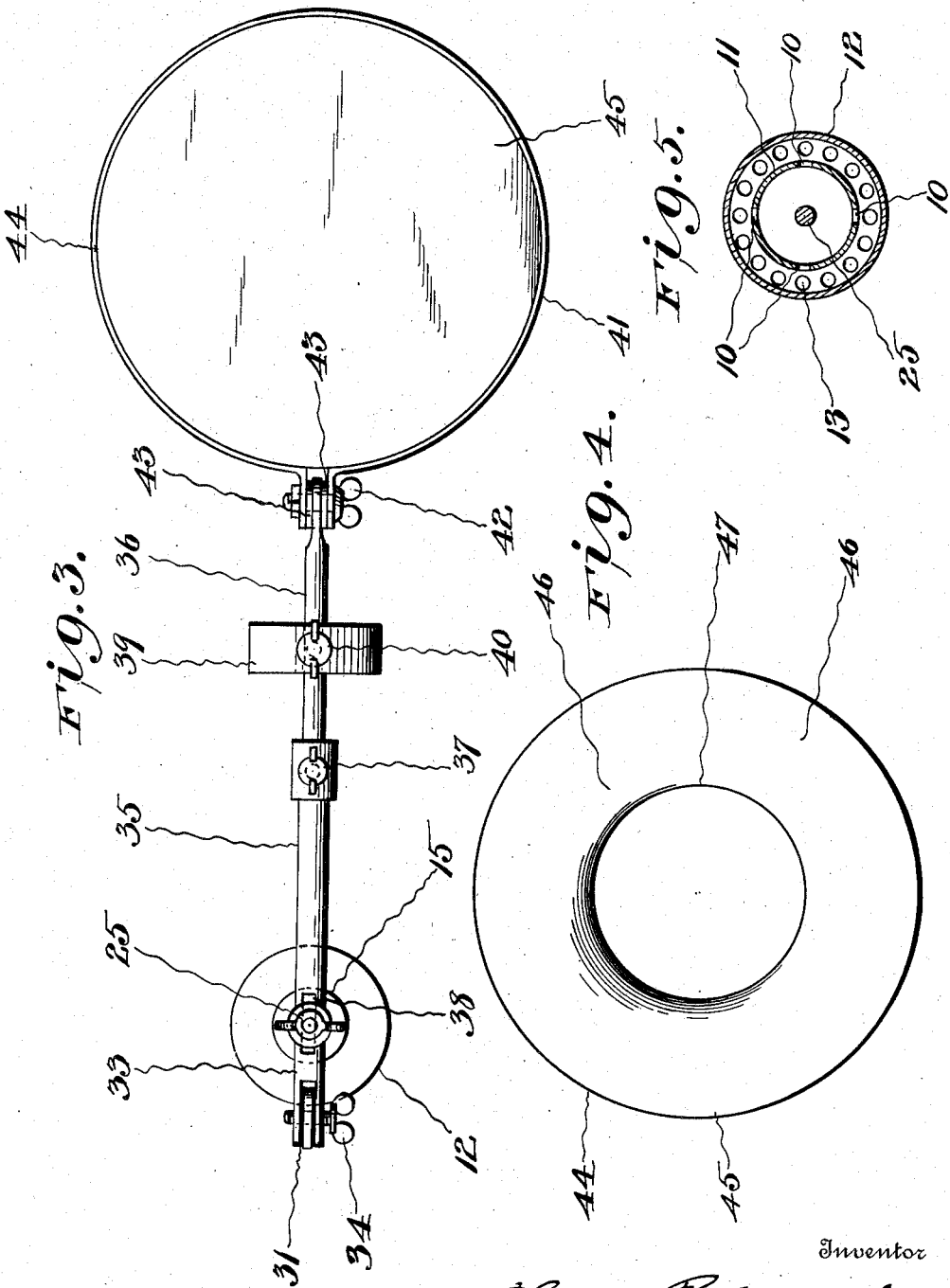

UNITED STATES PATENT OFFICE.

THOMAS P. MOSELEY, OF VALLEJO, CALIFORNIA.

VALVE.

1,015,453.

Specification of Letters Patent.

Patented Jan. 23, 1912.

Application filed February 24, 1910. Serial No. 545,591.

*To all whom it may concern:*

Be it known that I, THOMAS P. MOSELEY, a citizen of the United States, and residing at Vallejo, in the county of Solano, State of California, have invented certain new and useful Improvements in Valves; and I do declare the following to be a full, clear, and exact description of the invention, such as will enable others skilled in the art to which it pertains to make and use the same.

My invention relates to improvements in valves and more especially to inlet valves for use in connection with water closet flush tanks usually employed in the water systems of dwelling houses, theaters, hotels and other buildings.

It has for its object to prevent the noise caused by the splashing of water as it enters the flush tank, to regulate the height of the water in the tank and the length of the float lever and to control the operation of the inlet valve.

It also has for its object to provide an inlet valve for water closet flush tanks which is simple, inexpensive and durable in construction, not liable to get out of order, and exceedingly easy in operation.

It still further has for its object to provide a combined inlet valve and overflow pipe.

The device consists in the several features and combination of features as hereinafter more fully described and claimed.

Referring to the drawings:—Figure 1 is a vertical section through the flushing tank with the inlet valve and float in elevation. Fig. 2 is an enlarged vertical section of the inlet valve and float. Fig. 3 is a top plan view of the same. Fig. 4 is a bottom plan view of the float. Fig. 5 a horizontal section on the line *x*—*x* of Fig. 2. Fig. 6 a detail section of the valve plug.

In the drawings in which like numerals of reference denote like parts throughout the several views, 1 represents a flush tank of the usual type now in common use, but which may be of any other desired form, size or construction and may be made of any desired material. In the bottom of the flush tank an opening 2 is provided in which the water inlet valve 3 is mounted. The water inlet valve comprises a casing or pipe 4 with its extreme lower portion 5 screwthreaded and an annular flange 6 at the upper extremity of the screwthreaded portion and an upper portion 7 preferably smaller in circumference than the lower portion 5. A nut 8 is provided for retaining the casing or pipe 4 in the opening 2 of the flush tank and a washer or gasket 9 is placed between the flange 6 and the bottom of the flush tank to insure a water tight joint. Just above the flange 6 the casing or pipe 4 is provided with a double row of water outlet holes 10.

11 is a stationary muffler comprising a cylinder 12 having its bottom mounted on the lower portion of the casing or pipe 4 and its top on the upper portion 7 of the same, said cylinder being provided with a series of water outlet holes 13 in the bottom. The upper end of the upper portion 7 of the casing or pipe 4 is beveled as at 14, and 15 is a vertically slidable muffler mounted thereon which comprises, a cap 16 having a vertical bore 17 therethrough screwthreaded at the top, a beveled annular portion 18, corresponding in shape to the beveled portion 14 of the casing or pipe 4 on which it is designed to be seated, and a series of holes 19 in the top thereof.

Inside the casing or pipe 4 a partition 20 is provided, below the outlet holes 10, having a central aperture 21, said partition forming a seat for the vertically slidable valve plug 22, said valve plug being provided with longitudinally extending ribs 23, on its exterior, for the purpose of forming spaces 24 between it and the inner surface of the casing or pipe 4 for the passage of water from the inlet pipe to the interior of the flush tank. The valve plug 22 is provided with a valve stem 25 which is inside the casing or pipe 4, the lower end of which is screwthreaded and screwed into the same, 26 and 27 being washers secured on said valve stem inside the upper and lower portions of the valve plug, respectively, and 28 is a nut for securing the valve plug on said stem. The upper end of the valve stem 25 is provided with screwthreads 29 with which the screwthreads in the top of the vertically slidable muffler 15 engage and 30 is a thumb nut on the extreme upper end of the valve stem. The extent of movement of the valve plug 22, in relation to its seat, which governs the amount of water entering the flush tank and the space between the muffler 15 and its seat, which governs the amount of water flowing out of the bottom of the same, are both regulated by the adjustment of said muffler 15 on the screwthreads at the upper end of the valve stem. A vertical adjustable bracket 31 is secured on the upper portion 7 of the casing or pipe 4 and is adjusted and held at the desired point thereon by means of a thumb nut 32. A float lever 33 is pivoted to the upper end of the bracket 31 by means of a thumb nut 34, said float lever comprising two adjustable parts 35 and 36, the part 36 telescoping into the part 35, and 37 is a thumb nut for securing said parts together after the lever has been adjusted to the length that will maintain the requisite pressure on the valve plug 22, 38 being a slot in the part 35 of the float lever through which the valve stem 25 passes. The part 36 of the float lever 33 is provided with a weight 39 which is adjustable thereon and adapted to be held at any desired point by means of a thumb screw 40. To the outer end of the part 36 of the float lever 33 a band 41 is pivoted by means of a thumb nut 42, leather washers 43 being provided between the ends of the band and the part 36 of the float lever.

44 is a float which is encircled by the band 41 and on which said band is designed to be adjusted and fixed at any desired point for the purpose of regulating the height of water in the flush tank. The float comprises a hollow inverted cup shaped cylinder 45 having a concave flange 46 extending upwardly and inwardly from the lower edge thereof forming a central opening 47.

The upper part of the cup shaped cylinder 45 being air tight the concave flange assists in the opening of the valve by causing a downward suction as the water is drawn from the tank.

57 is a flush valve connected to a cord or chain which is operated by means of a reel or wheel 67 which in turn is designed to be operated by means of a crank 68.

The operation is as follows:—Assuming that the flush tank contains the usual supply of water, by turning the crank 68 to the right the wheel or reel 67 is caused to rotate and winds the cord or chain thereon which causes said cord or chain to elevate the flush valve 57 and permits water to escape from the flush tank. As the water escapes its level in the flush tank will gradually become lower and lower and this together with the downward suction of the water on the float assists in the downward movement of the float, and the downward movement of the float causes the valve plug 22 to move downward which allows water from the inlet pipe to pass into the casing or pipe 4, through the holes 10 into the stationary muffler 11 and through the holes 13 in the bottom thereof into the flush tank. The muffler 11 directs the water gently downward through the holes 13 and distributes it without any spraying, splashing or noise. Any water that passes the holes 13 and flows upward through the portion 7 of the casing or pipe 4 will enter the vertically slidable muffler 15 and will be directed downward thereby without any spray, splashing or noise. By constructing the float 44 with a concave flange at the bottom and a central opening, when the flush tank is filling, the air imprisoned in the float will keep the water line in the float below the water line of the flush tank and this displacement will tend to prevent the float from rising as fast as it would otherwise, that is to say it becomes automatically heavier, on account of the water therein, than a closed float of the same dimensions and still floats. The advantage of this added weight becomes apparent when the water is allowed to run out of the flush tank, for then the water line in the float will be above the water line in the tank and cause the float to act as a weight to draw down the outer end of the lever 33 and opens the inlet valve.

I do not desire to be understood as limiting myself to the specific details of construction and arrangement as herein described and illustrated, as it is manifest that variations and modifications may be made in the features of construction and arrangement, in the adaptation of the device to the various conditions of use without departing from the spirit and scope of my invention and improvements. I therefore reserve the right to all such variations and modifications as properly fall within the scope of my invention and the terms of the following claims.

What I claim is:—

1. In a valve for flush tanks, a casing or pipe provided with a stationary muffler with outlet holes and a movable muffler with an outlet, substantially as described.

2. In a valve for flush tanks, a casing or pipe provided with a stationary muffler with outlet holes and an adjustable muffler on the top of said casing, substantially as described.

3. In a valve for flush tanks, a casing or pipe, provided with a stationary muffler, a valve plug having a stem provided with a movable muffler, said movable muffler controlling the extent of movement of the valve plug by being adjusted on the valve stem, substantially as described.

4. In a valve for flush tanks, a casing or pipe provided with a valve plug and stem and two mufflers provided with water outlets, one of said mufflers controlling the extent of movement of the valve plug and directing the water passing upward through said casing toward the bottom of the flush tank, substantially as described.

5. In a valve for flush tanks, a casing or pipe provided with outlet holes, a valve plug and stem, a muffler mounted on said casing and surrounding said outlet holes and provided with outlet holes, a muffler mounted on said stem having a bore which fits over the upper end of the casing, said muffler controlling the flow of water from the upper end of the casing and the extent of movement of the valve plug, substantially as described.

6. In a valve for flush tanks, a casing or pipe provided with outlet holes, a muffler mounted on the casing and inclosing said outlet holes and provided with outlet holes in its bottom, a valve plug within said casing provided with a stem, a muffler adjustably secured on said stem and inclosing the upper end of said casing and a float operatively connected to said stem for operating the valve plug and adjustable muffler, substantially as described.

7. In a valve for flush tanks, a casing or pipe provided with outlet holes, a stationary muffler mounted on the casing and inclosing the outlet holes and provided with outlet holes in its bottom, a valve plug within said casing provided with a stem, a vertically movable muffler adjustably secured on said stem and inclosing the upper end of said casing and a float operatively connected to said stem for operating the valve plug and vertically movable muffler, substantially as described.

8. In a valve for flush tanks, a casing or pipe having water outlets and provided with a stationary muffler on its lower portion having water outlets, a movable muffler on the upper end of said casing and means for adjusting the same with relation to the top of the said casing, substantially as described.

9. In an inlet valve for flush tanks, a casing or pipe provided with upper and lower portions of different size, the lower portion provided with outlet holes, a muffler having its top mounted on the upper portion of the casing and its bottom on the lower portion of the casing and provided with outlet holes in its bottom, a valve plug in the casing provided with a stem having an adjustable muffler thereon fitting over and inclosing the top of the casing, said top forming a seat therefor, an adjustable bracket on the upper portion of the casing, a float lever pivoted to said bracket and connected to the top of the valve plug stem and an adjustable float on the outer end of said float lever, substantially as described.

10. In an inlet valve for flush tanks, a casing or pipe, a valve plug and stem therein, an adjustable bracket mounted on said casing, a telescopic lever pivoted on said bracket and connected to the valve plug stem, a float, a band pivoted on the end of said lever and encircling the float and means for adjusting said band on said float for the purpose of regulating the height of water in the tank, substantially as described.

11. In an inlet valve for flush tanks, a float operatively connected to the valve, and comprising a hollow cylinder having a concave flange and an opening, substantially as described.

12. In an inlet valve for flush tanks, a float comprising a hollow cylinder open at the bottom and provided with a concave inwardly extending flange and an adjustable band encircling said float for adjusting the height of the same with relation to the bottom of the tank, substantially as described.

In testimony whereof I affix my signature in presence of two witnesses.

THOMAS P. MOSELEY.

Witnesses:
J. H. OSTELLO,
W. H. GRIFFIN.